United States Patent
Eiselt (10) Patent No.: US 7,206,516 B2
(45) Date of Patent: Apr. 17, 2007

(54) APPARATUS AND METHOD FOR MEASURING THE DISPERSION OF A FIBER SPAN

(75) Inventor: Michael H. Eiselt, Middletown, NJ (US)

(73) Assignee: Pivotal Decisions LLC, Las Vegas, NV (US)

( * ) Notice: Subject to any disclaimer, the term of this patent is extended or adjusted under 35 U.S.C. 154(b) by 655 days.

(21) Appl. No.: 10/427,897

(22) Filed: Apr. 30, 2003

(65) Prior Publication Data

US 2004/0028415 A1 Feb. 12, 2004

Related U.S. Application Data

(60) Provisional application No. 60/377,083, filed on Apr. 30, 2002.

(51) Int. Cl.
*H04B 10/12* (2006.01)
(52) U.S. Cl. .................................. 398/147; 398/150
(58) Field of Classification Search ............... 398/147, 398/150
See application file for complete search history.

(56) References Cited

U.S. PATENT DOCUMENTS

| | | | |
|---|---|---|---|
| 4,229,831 A | 10/1980 | Lacher | |
| 4,535,459 A | 8/1985 | Hogge, Jr. | |
| 4,636,859 A | 1/1987 | Vernhet et al. | |
| 4,710,022 A | 12/1987 | Soeda et al. | |
| 4,779,790 A * | 10/1988 | Wallgren et al. | 228/180.1 |
| 5,224,183 A | 6/1993 | Dugan | |
| 5,225,922 A | 7/1993 | Chraplyvy et al. | |
| 5,267,071 A | 11/1993 | Little et al. | |
| 5,299,048 A | 3/1994 | Suyama | |
| 5,321,541 A | 6/1994 | Cohen | |
| 5,406,368 A * | 4/1995 | Horiuchi et al. | 356/73.1 |
| 5,455,703 A | 10/1995 | Duncan et al. | |
| 5,559,625 A | 9/1996 | Smith et al. | |
| 5,613,210 A | 3/1997 | Van Driel et al. | |
| 5,726,784 A | 3/1998 | Alexander et al. | |

(Continued)

FOREIGN PATENT DOCUMENTS

JP 01115230 5/1989

(Continued)

OTHER PUBLICATIONS

"Polarization Mode Dispersion in Restricted Optical Bandwidth: An Evaluation of Measurement Techniques," National Physics laboratory, to Harris et al. pp. 1-23.*

(Continued)

*Primary Examiner*—Kenneth Vanderpuye
*Assistant Examiner*—Ken Malkowski
(74) *Attorney, Agent, or Firm*—Woodcock Washburn LLP (57) ABSTRACT

The invention pertains to optical fiber transmission systems, and is particularly relevant to transmission of large volumes of data over long distances at high rates. An improved apparatus and method for measuring dispersion in a fiber span is disclosed. In particular, the invention teaches a highly accurate technique for measuring the fiber dispersion at a single wavelength. Transmitter and receiver structure and data processing algorithms are disclosed. An improved apparatus and method for measuring dispersion in a fiber span. In particular, the invention teaches a highly accurate technique for measuring the fiber dispersion at a single wavelength. Transmitter and receiver structure and data processing algorithms are disclosed.

19 Claims, 6 Drawing Sheets

U.S. PATENT DOCUMENTS

| | | | |
|---|---|---|---|
| 5,737,118 A | 4/1998 | Sugaya et al. | |
| 5,778,116 A | 7/1998 | Tomich | |
| 5,790,285 A | 8/1998 | Mock | |
| 5,812,290 A | 9/1998 | Maeno et al. | |
| 5,877,881 A | 3/1999 | Miyauchi et al. | |
| 5,903,613 A | 5/1999 | Ishida | |
| 5,914,794 A | 6/1999 | Fee | |
| 5,914,799 A | 6/1999 | Tan | |
| 5,936,753 A | 8/1999 | Ishikaawa | |
| 5,940,209 A | 8/1999 | Nguyen | |
| 5,963,350 A | 10/1999 | Hill | |
| 5,995,694 A | 11/1999 | Akasaka et al. | |
| 6,005,702 A | 12/1999 | Suzuki et al. | |
| 6,021,245 A | 2/2000 | Berger et al. | |
| 6,038,062 A | 3/2000 | Kosaka | |
| 6,075,634 A | 6/2000 | Casper et al. | |
| 6,078,414 A | 6/2000 | Iwano | |
| 6,081,360 A | 6/2000 | Ishikawa et al. | |
| 6,084,694 A | 7/2000 | Milton et al. | |
| 6,088,152 A | 7/2000 | Berger et al. | |
| 6,108,074 A | 8/2000 | Bloom | |
| 6,122,095 A | 9/2000 | Fatehi | |
| 6,151,334 A | 11/2000 | Kim et al. | |
| 6,157,477 A | 12/2000 | Robinson | |
| 6,160,614 A | 12/2000 | Unno | |
| 6,163,392 A | 12/2000 | Condict et al. | |
| 6,163,636 A | 12/2000 | Stentz et al. | |
| 6,173,094 B1 | 1/2001 | Bowerman et al. | |
| 6,177,985 B1 | 1/2001 | Bloom | |
| 6,198,559 B1 | 3/2001 | Gehlot | |
| 6,229,599 B1 | 5/2001 | Galtarossa | |
| 6,236,481 B1 | 5/2001 | Laor | |
| 6,236,499 B1 | 5/2001 | Berg et al. | |
| 6,246,510 B1 | 6/2001 | BuAbbud et al. | |
| 6,259,553 B1 | 7/2001 | Kinoshita | |
| 6,259,554 B1 | 7/2001 | Shigematsu et al. | |
| 6,259,693 B1 | 7/2001 | Ganmukhi et al. | |
| 6,259,845 B1 | 7/2001 | Sardesai | |
| 6,272,185 B1 | 8/2001 | Brown | |
| 6,275,315 B1 | 8/2001 | Park et al. | |
| 6,288,811 B1 | 9/2001 | Jiang et al. | |
| 6,288,813 B1 | 9/2001 | Kirkpatrick et al. | |
| 6,307,656 B2 | 10/2001 | Terahara | |
| 6,317,231 B1 | 11/2001 | Al-Salameh et al. | |
| 6,317,255 B1 | 11/2001 | Fatehi et al. | |
| 6,323,950 B1 | 11/2001 | Kim et al. | |
| 6,327,060 B1 | 12/2001 | Otani et al. | |
| 6,331,991 B1 * | 12/2001 | Mahgerefteh | 372/33 |
| 6,356,384 B1 | 3/2002 | Islam | |
| 6,359,729 B1 | 3/2002 | Amoruso | |
| 6,388,801 B1 | 5/2002 | Sugaya et al. | |
| 6,396,853 B1 | 5/2002 | Humphrey et al. | |
| 6,519,082 B2 | 2/2003 | Ghera et al. | |
| 6,586,724 B2 * | 7/2003 | Graves | 250/227.23 |
| 6,714,715 B2 * | 3/2004 | Johnson | 385/140 |
| 2001/0005271 A1 | 6/2001 | Leclerc et al. | |
| 2001/0007605 A1 | 7/2001 | Inagaki et al. | |
| 2001/0009468 A1 | 7/2001 | Fee | |
| 2001/0014104 A1 | 8/2001 | Bottorff et al. | |
| 2001/0050767 A1 * | 12/2001 | Babin et al. | 356/73.1 |
| 2002/0012152 A1 | 1/2002 | Agazzi et al. | |
| 2002/0015220 A1 | 2/2002 | Papernyl et al. | |
| 2002/0034197 A1 | 3/2002 | Tometta et al. | |
| 2002/0044317 A1 | 4/2002 | Gentner et al. | |
| 2002/0044324 A1 | 4/2002 | Hoshida et al. | |
| 2002/0048287 A1 | 4/2002 | Silvers | |
| 2002/0051468 A1 | 5/2002 | Ofek et al. | |
| 2002/0063948 A1 | 5/2002 | Islam et al. | |
| 2002/0064181 A1 | 5/2002 | Ofek et al. | |
| 2002/0075903 A1 | 6/2002 | Hind | |
| 2002/0080809 A1 | 6/2002 | Nicholson et al. | |

FOREIGN PATENT DOCUMENTS

| | | |
|---|---|---|
| JP | 02238736 | 9/1990 |

OTHER PUBLICATIONS

"16×20-Gb/s 400-km WDM Transmission Over NZDSF Using a Slop-Compensating fiber-Grating Module," IEEE Photonics Technology Letters Apr. 2000, pp. 437-439 to Gnauck et al.*

* cited by examiner

APPARATUS AND METHOD FOR MEASURING THE DISPERSION OF A FIBER SPAN

CROSS-REFERENCE TO RELATED APPLICATION

This application claims priority to U.S. Provisional Patent Application Ser. No. 60/377,083, entitled "METHOD FOR DISPERSION MEASUREMENT OF AN OPTICAL FIBER AT A FIXED WAVELENGTH", by Michael H. Eiselt, filed Apr. 30, 2002.

TECHNICAL FIELD OF THE INVENTION

The present invention relates, in general, to the field of optical communications, and in particular to, an improved apparatus and method for measuring dispersion in a fiber span. In particular, the invention teaches a highly accurate technique for measuring the fiber dispersion at a single wavelength. Transmitter and receiver structure and data processing algorithms are disclosed.

BACKGROUND OF THE INVENTION

A goal of many modern long haul optical transport systems is to provide for the efficient transmission of large volumes of voice traffic and data traffic over trans-continental distances at low costs. Various methods of achieving these goals include time division multiplexing (TDM) and wavelength division multiplexing (WDM). In time division multiplexed systems, data streams comprised of short pulses of light are interleaved in the time domain to achieve high spectral efficiency, high data rate transport. In wavelength division multiplexed systems, data streams comprised of short pulses of light of different carrier frequencies, or equivalently wavelength, are co-propagate in the same fiber to achieve high spectral efficiency, high data rate transport.

The transmission medium of these systems is typically optical fiber. In addition there is a transmitter and a receiver. The transmitter typically includes a semiconductor diode laser, and supporting electronics. The laser may be directly modulated with a data train with an advantage of low cost, and a disadvantage of low reach and capacity performance. After binary modulation, a high bit may be transmitted as an optical signal level with more power than the optical signal level in a low bit. Often, the optical signal level in a low bit is engineered to be equal to, or approximately equal to zero. In addition to binary modulation, the data can be transmitted with multiple levels, although in current optical transport systems, a two level binary modulation scheme is predominantly employed.

Consequently, the data propagates through the optical fiber as a short pulse. One of the impairments that this pulse can suffer is its spreading, or dispersion, in time. Excessive pulse spreading resulting from dispersion will cause interference between adjacent bits at the receiver. Dispersion can occur for a variety of reasons. In multimode fiber, different transverse modes propagate different effective distances, to cause modal dispersion. Consequently optical transport over any appreciable distance is accomplished using single mode fiber. Chromatic dispersion of the pulse occurs because the index of refraction of the glass fiber varies with frequency. Since a short data pulse is comprised of a band of frequencies, chromatic dispersion causes pulse shape distortion and spreading as the different spectral components of the data pulse propagate at different velocities in the fiber. In modern optical transport systems this dispersion, or pulse spreading must be periodically corrected, while comprehending the effect of pulsewidth on the nonlinear impairments in the fiber.

Chromatic dispersion is therefore an important engineering design parameter in optical transport systems. The glass fiber through which the pulses propagate must be characterized for their dispersion. There are several methods and apparatus available today to do so, but all suffer from various shortcomings.

For example, the pulse delay method measures the differential delay between optical pulses of various wavelengths using a multiple wavelength transmitter at one end of the fiber and a receiver at the other end. Alternatively an optical time domain reflectometer may be used in a single ended measurement. A main disadvantage to the pulse delay method is a limitation in accuracy of the measurement technique caused by errors in determining the arrival times of the pulses due to limitations in the receiver electronics and due to pulse spreading caused by the dispersion in the fiber which is the object of the measurement. These limitations prevent the measurement from being accurate enough for optical transport systems with trans-continental reaches. Consequently there is a need for dispersion measurement with sufficient precision and accuracy for ultra long haul fiber characterization.

An alternate dispersion measurement technique is the phase shift, method. This technique uses a tunable laser source, or a tunable filter/monochromator, to probe the fiber. Here, the tunable source is modulated, and the phase of the modulated signal exiting the fiber is compared with the phase at a second wavelength. The average chromatic dispersion over the interval between the two wavelengths is determined from the phase shift and wavelength interval. In addition to the need for a tunable source, this method suffers from error introduced by the finite spectral width of the tunable source. These limitations prevent the measurement from being accurate enough for optical transport systems with trans-continental reaches. Consequently there is a need for dispersion measurement with sufficient precision and accuracy for ultra long haul fiber characterization. Another drawback of this technique is the large size and cost of the tunable laser source. There is consequently a need for a technique that comprises affordable and compact equipment. Yet another limitation of this technique is the long measurement time that the method takes, mainly due to the tuning of the laser source or the tunable filter/monochromator. This long time is both inconvenient and increases the errors because of equipment drift. Thus there is a need for a measurement technique that is performed quickly, since this saves time and produces a result that is less susceptible to drift errors.

It is an object of this invention to teach an improved method and apparatus for measuring dispersion that does not suffer from these limitations in accuracy and precision. It is a further object of this invention to provide a compact apparatus that makes a chromatic dispersion measurement quickly.

SUMMARY OF THE INVENTION

In the present invention, a dispersion measurement technique is taught to measure the dispersion of a fiber span at a single wavelength with high accuracy as required by ultra long haul optical transport systems capable of transcontinental reach.

In one embodiment of the invention, an optical fiber dispersion measurement system is disclosed.

In another embodiment of the invention a method for measuring dispersion in an optical fiber is disclosed.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

While the making and using of various embodiments of the present invention are discussed in detail below, it should be appreciated that the present invention provides many applicable inventive concepts which can be embodied in a wide variety of specific contexts. The specific embodiments described herein are merely illustrative of specific ways to make and use the invention and do not delimit the scope of the invention.

Figure 1:
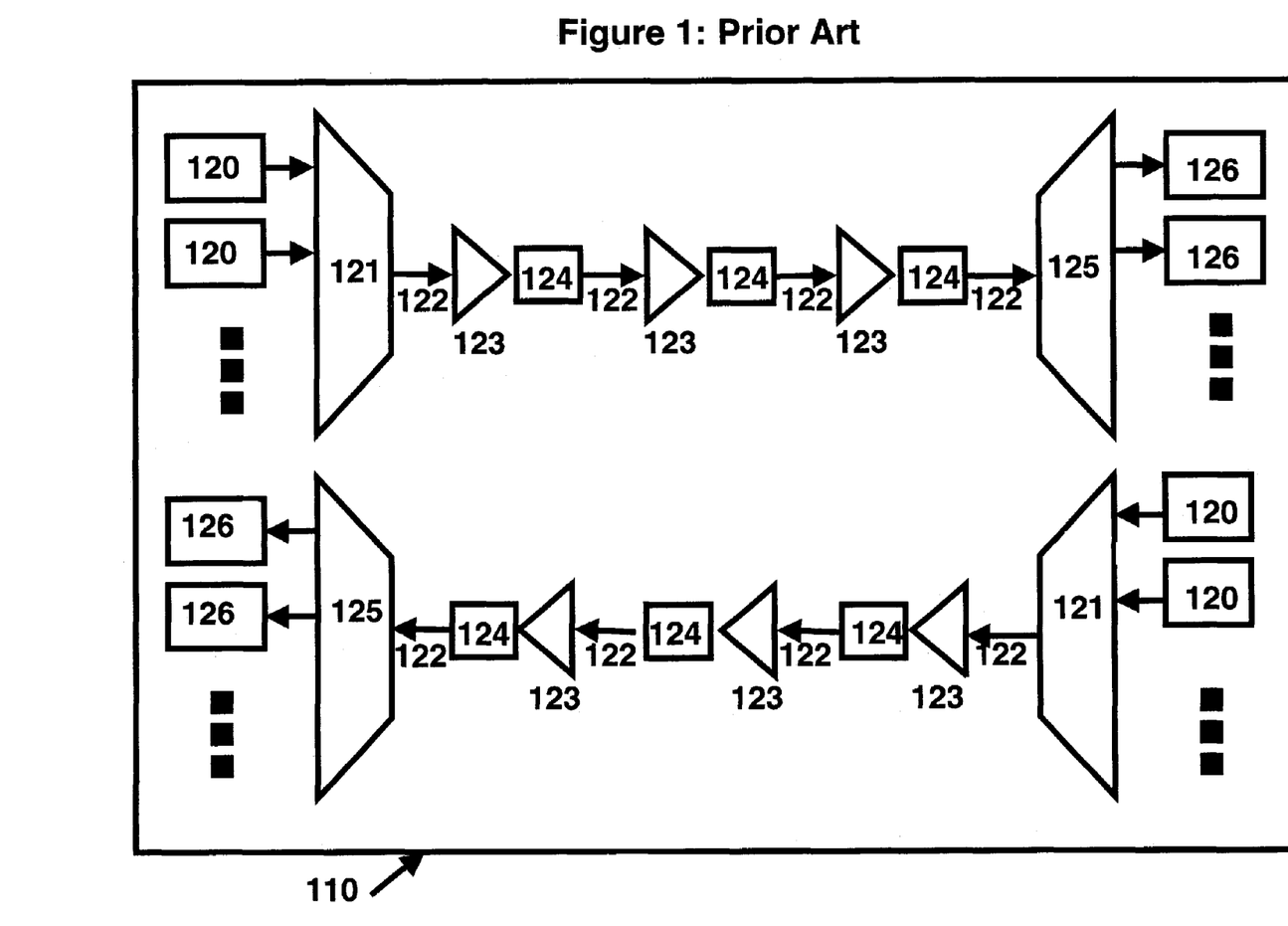
FIG. 1 is a schematic illustration of a prior art multiplexed optical transport system.

FIG. 1 is an illustrative block diagram of a prior art optical transport system 110 for data and/or voice transmission used to support the present invention. Typical long haul optical transport dense wavelength division multiplexed (DWDM) systems transmit 40 to 80 10 Gbps (gigabit per second) channels across distances of 3000 to 6000 km in a single 30 nm spectral band. Shown in the figure is a duplex system in which traffic is both transmitted and received between parties at opposite end of the link. The optical carrier is generated using transmitters 120. In current DWDM long haul transport systems transmitters 120 are DFB lasers stabilized to specified frequencies on the ITU frequency grid and externally modulated.

In a DWDM system, different channels operating at distinct carrier frequencies are multiplexed using a multiplexer 121. Such multiplexers may be implemented using array waveguide (AWG) technology or thin film technology, or a variety of other technologies which are known. After multiplexing, the optical signals are coupled into the transport fiber for transmission to the receiving end of the link. The total link distance may, in modern optical transport systems, be between different cities separated by continental distances, from 1000 km to 6000 km, for example. To successfully bridge these distances with sufficient optical signal power relative to noise, the total fiber distance is separated into fiber spans 122, and the optical signal is periodically amplified using in line optical amplifiers 123 after each fiber span 122. Typical fiber span distances between optical amplifiers 123 is 50–100 km. Thus, for example, 30 100 km spans would be used to transmit optical signals between points 3000 km apart. Examples of inline optical amplifiers 123 include erbium doped fiber amplifiers (EDFAs) and semiconductor optical amplifiers (SOAs).

Often, there is also included dispersion compensation modules 124 with the in line amplifiers 123. These dispersion compensator modules 124 adjust the phase information of the optical pulses in order to compensate for the chromatic dispersion in the optical fiber while appreciating the role of optical nonlinearities in the optical fiber.

At the receiving end of the link, the optical channels are de-multiplexed using a de-multiplexer 125. Such de-multiplexers may be implemented using array waveguide (AWG) technology or thin film technology, or a variety of other technologies known in the art. Each channel is then optically coupled to separate optical receivers 126. The optical receiver 126 is typically comprised of a semiconductor photodetector and accompanying electronics.

It is a purpose of this invention to teach improved apparatus and methods for characterizing the properties of the fiber spans 122. In particular the invention relates to a dispersion measurement technique to measure the dispersion at a single wavelength with a high accuracy.

It should be noted that FIG. 1 depicts an optical transport system 110 supporting duplex operation wherein each endpoint can both send and receive voice and data traffic. This is important to achieve a typical conversation. In FIG. 1, duplex operation is shown to use two distinct fibers, the both together often referred to as a fiber pair. FIG. 1 is bi-restrictive in this or in many other instances. For example, optical transport systems are sometimes deployed with bidirectional traffic providing duplex service on a single fiber.

Other common variations in the prior art include the presence of post-amplifiers and pre-amplifiers just before and after the multiplexer 121 and de-multiplexer 125. Another variation that may be employed is the optical dropping and adding of channels at cities located in between the two end cities. The invention disclosed herein, would find application in any of these variations, as well as others. For example, the improved dispersion measurement technique taught herein would benefit short reach, or metro applications which may not include an inline optical amplifier 123.

Prior to installation of the dispersion compensation module 124, the dispersion of a transmission fiber span 122 needs to be measured to determine the correct amount of dispersion compensation. Knowing the fiber type, it is sufficient to measure the dispersion at the center of the transmission band. Furthermore, it is desirable to measure the relative dispersion slope in order to verify the fiber type. The range of dispersion, D, to be measured is determined by the fiber type, the maximum length of the fiber span 122, and the wavelength band (C-band or L-band). The required precision of the measurement is mainly determined by the dispersion tolerance of the transmission system, and this tolerance differs with fiber type. Specific requirements on this dispersion measurement include a dispersion range of 30 to 2500 ps/nm. This range would allow for span distances between 30 km of LS type fiber to 130 km of SMF-28 type fiber and operation in the L-band. The accuracy of the dispersion measurement should be +/−10 ps/nm for SMF-28 type fiber and +/−3 ps/nm for LEAF type fiber. The measurement technique should withstand fiber losses as low as 8 dB and as high as 33 dB, again to cover fiber spans between 30 km and 130 km. The dispersion measurement technique should also cover a range of relative dispersion slope (RDS). This range should be between 1/RDS=15 nm (for LS type fiber) and 1/RDS=330 nm (for SMF-28 type fiber). The 1/RDS accuracy must be +/−20 nm. This is generally sufficient to distinguish between different commercially available fiber types.

Figure 2:
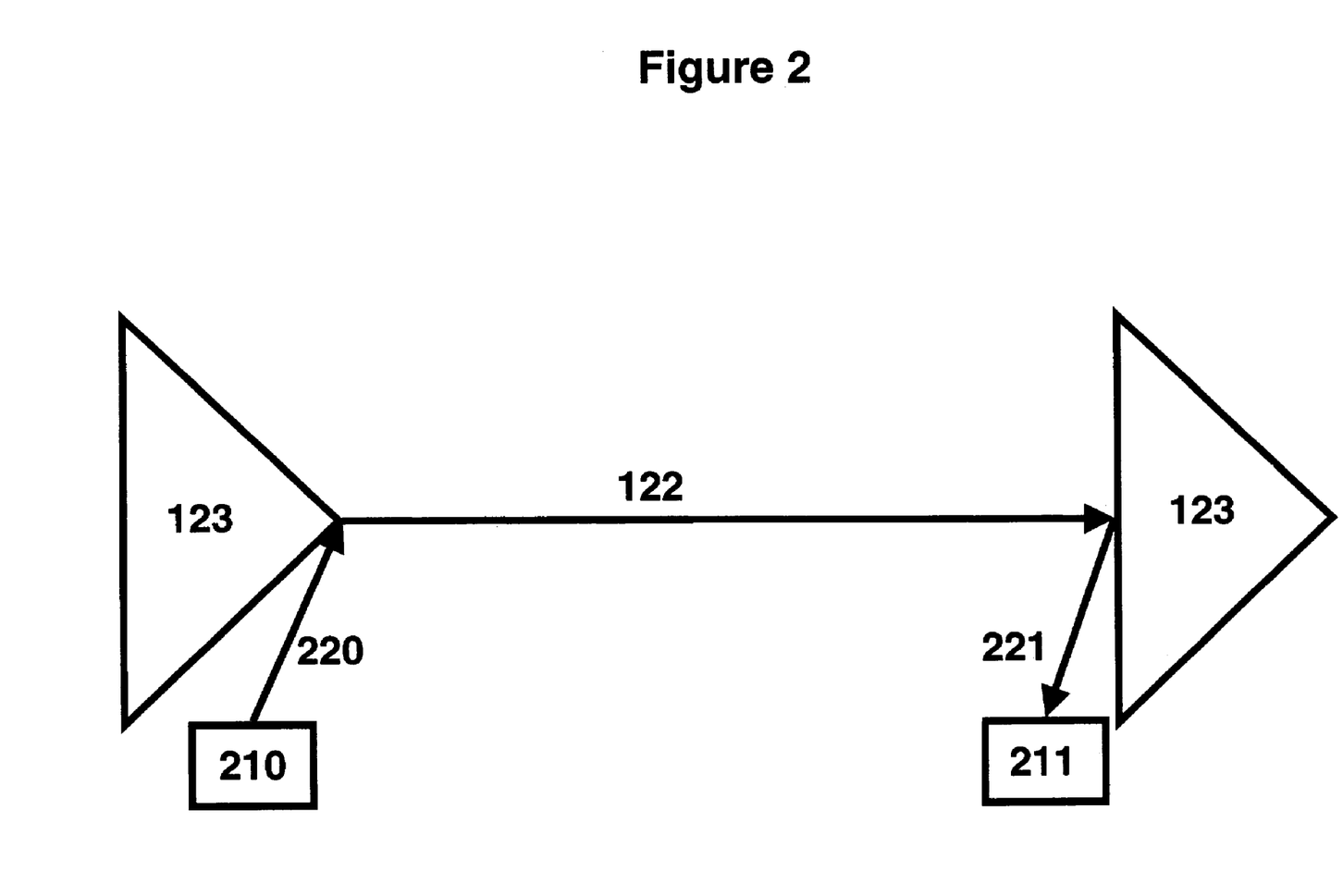
FIG. 2 is a schematic illustration of the invention deployed to measure dispersion in a fiber span.

In FIG. 2 is shown the deployment of the invention to measure a fiber span 122 between two in line optical amplifiers 123. A measurement transmitter module 210 is optically coupled by optical coupling means 220 to the head end of the fiber span 122. A measurement receiver module 211 is optically coupled to the other end of the fiber span by optical coupling means 221. Representative examples of optical coupling means 220 and 221 include fiber pigtails, free space coupling potentially including focusing elements, or other optical transmitting structure.

Figure 3:
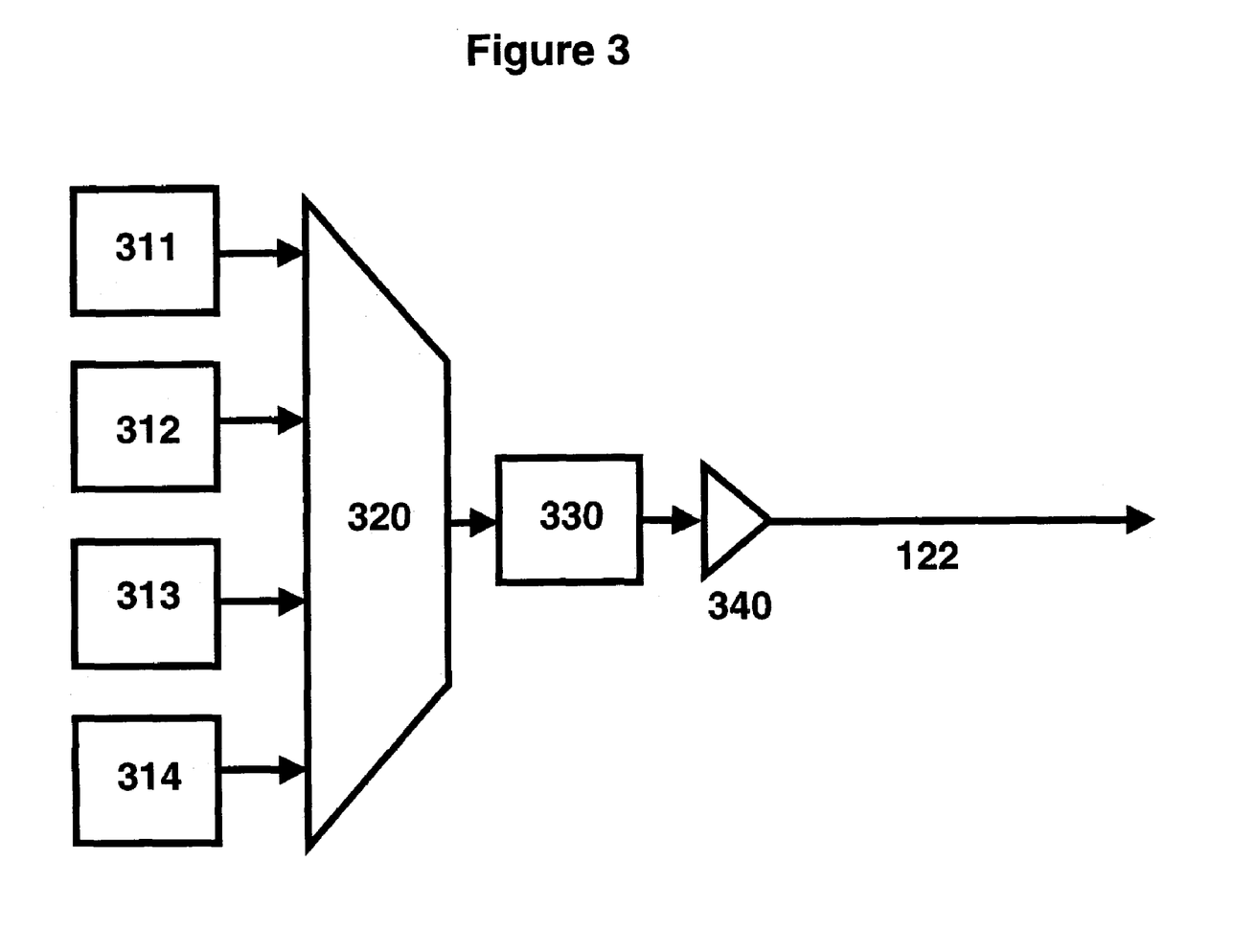
FIG. 3 is a schematic illustration of the measurement transmitter module which is a subject of this invention.

In FIG. 3 is shown the measurement transmitter module 210 of the invention, and its relation to the fiber span 122 that is to be measured. The measurement transmitter module comprises four measurement lasers, 311, 312, 313, and 314, coupling means 320, intensity modulator 330 and optical amplifier 340. Measurement laser 311 emits a laser signal at wavelength $\lambda_1$, measurement laser 312 emits a laser signal at wavelength $\lambda_2$, measurement laser 313 emits a laser signal at wavelength $\lambda_3$, and measurement laser 314 emits a laser signal at wavelength $\lambda_4$. The difference between wavelengths $\lambda_1$ and $\lambda_2$ is $\Delta\lambda$, the difference between wavelengths $\lambda_2$ and $\lambda_3$ is $\Delta\lambda$ and the difference between wavelengths $\lambda_3$ and $\lambda_4$ is $\Delta\lambda$. The four wavelengths of the measurement lasers 311, 312, 313, and 314 are centered around a target wavelength $\lambda_0$. The light of these four continuous wave measurement lasers 311, 312, 313, and 314 is coupled together via coupling means 320. In the preferred embodiment, coupling means 320 is a multiplexer. Other embodiments of coupling means 320 can include an array waveguide (AWG), thin film technology, fiber couplers, or through a variety of other technologies. The combined light from the four measurement lasers are then modulated at a sinusoidal frequency $f_m$ using intensity modulator 330. In a preferred embodiment, the modulation depth of the modulated composite laser signal should be between 10% and 50%. Intensity modulator 330 may be realized using a lithium niobate modulator or an electro-absorption modulator, or using one of a variety of other modulator technologies. Optical amplifier 340 may be used to boost the measurement laser signals to a value sufficient to overcome loss in the fiber span 122. Optical amplifier 340 may be realized using erbium doped fiber amplifiers (EDFAs) or semiconductor optical amplifiers, or using one of a variety of other optical amplifier technologies. In a preferred embodiment, a semiconductor optical amplifier is used to both modulate the measurement laser signals and simultaneously amplify the measurement laser signals.

An improved accuracy and precision of the dispersion measurement is achieved when the wavelength separation, $\Delta\lambda$ of the output wavelengths of measurement lasers 311, 312, 313 and 314 is tightly controlled. Center wavelength $\lambda_0$ may be controlled to +/−0.1 nm, while wavelength separation $\Delta\lambda$ must be controlled to +/−0.02 nm. In a preferred embodiment this is accomplished using a multi-wavelength laser on a single substrate. In another preferred embodiment this is accomplished by locating the four lasers in close proximity to achieve thermal coupling among the lasers.

Figure 4:
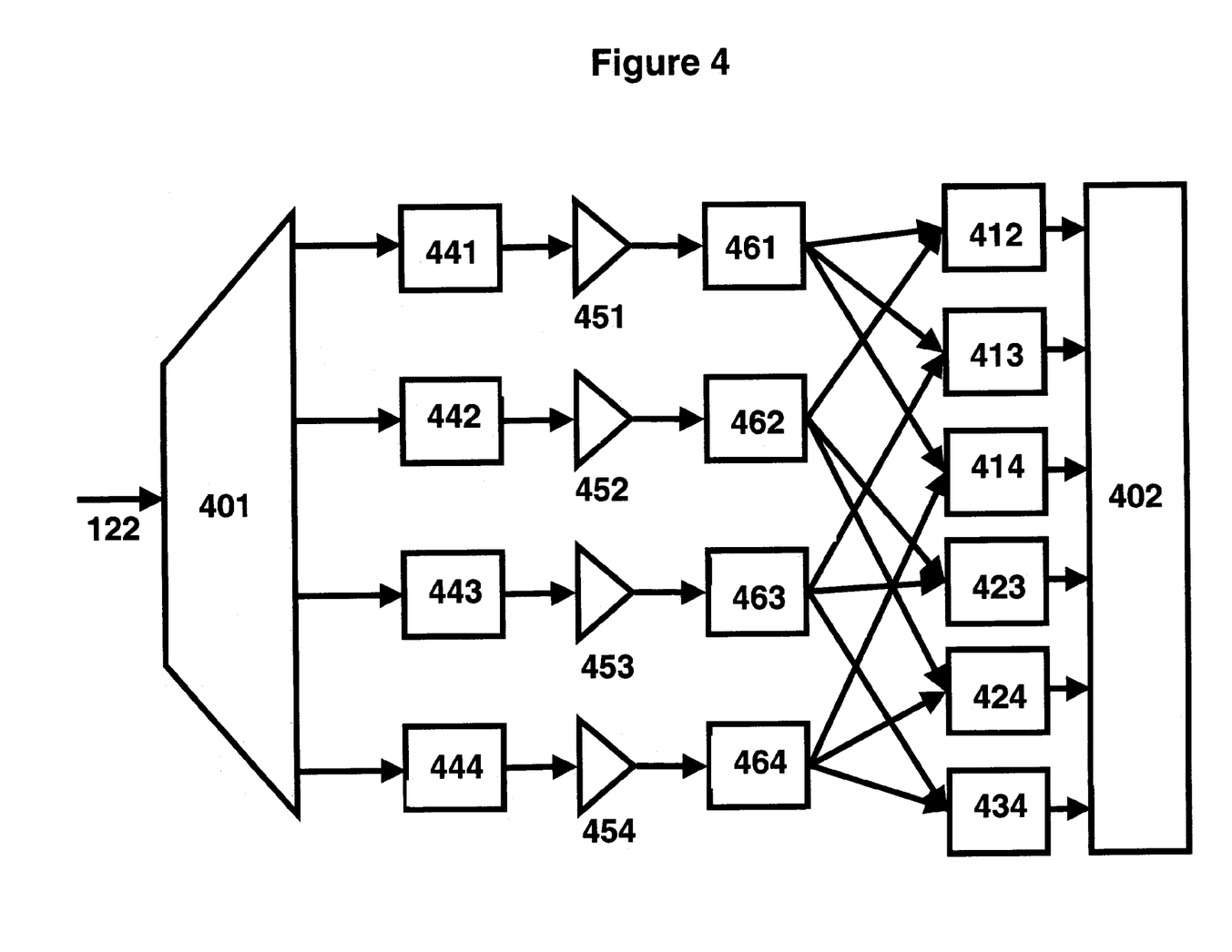
FIG. 4 is a schematic illustration of the measurement receiver module which is a subject of this invention.

In FIG. 4 is shown the measurement receiver module 211 of the invention, and its relation to the fiber span 122 that is to be measured. The measurement modulator module comprises optical de-multiplexer 401, four receiver photodiodes 441, 442, 443, and 444, four electronic amplifiers 451, 452, 453, and 454, four narrowband electronic filters 461, 462, 463, and 464, six phase comparators, 412, 413, 414, 423, 424 and 434, and processing block 402. In a preferred embodiment, the receiver photodiodes 441, 442, 443 and 444 may be implemented using PIN photodiodes. In another preferred embodiment receiver photodiodes 441, 442, 443, and 444 are implemented with avalanche photodiodes with improved responsivity enabling lower launch power in the measurement transmitter module. The output signal of receiver photodiode 441 is amplified by electronic amplifier 451, then filtered by narrowband electronic filter 461. Narrowband electronic filter 461 is a bandpass filter with a central frequency $f_m$. The output signal of receiver photodiode 442 is amplified by electronic amplifier 452, then filtered by narrowband electronic filter 462. Narrowband electronic filter 462 is a bandpass filter with a central frequency $f_m$. The output signal of receiver photodiode 443 is amplified by electronic amplifier 453, then filtered by narrowband electronic filter 463. Narrowband electronic filter 463 is a bandpass filter with a central frequency $f_m$. The output signal of receiver photodiode 444 is amplified by electronic amplifier 454, then filtered by narrowband electronic filter 464. Narrowband electronic filter 464 is a bandpass filter with a central frequency $f_m$.

The output of narrowband electronic filter 461 is split and sent to phase comparator 412, 413 and 414. The output of narrowband electronic filter 462 is split and sent to phase comparator 412, 423 and 424. The output of narrowband electronic filter 463 is split and sent to phase comparator 413, 423 and 434. The output of narrowband electronic filter 464 is split and sent to phase comparator 414, 423 and 434.

Phase comparator 412 compares the phase of signals from narrowband electronic filter 461 and narrowband electronic filter 462. The output signal of phase comparator 412 is proportional to the phase difference between the signal received by photodetector 441 and photodetector 442 and therefore proportional to group delay difference between wavelengths $\lambda_1$ and $\lambda_2$. Phase comparator 413 compares the phase of signals from narrowband electronic filter 461 and narrowband electronic filter 463. The output signal of phase comparator 413 is proportional to the phase difference between the signal received by photodetector 441 and photodetector 443 and therefore proportional to group delay difference between wavelengths $\lambda_1$ and $\lambda_3$. Phase comparator 414 compares the phase of signals from narrowband electronic filter 461 and narrowband electronic filter 464. The output signal of phase comparator 414 is proportional to the phase difference between the signal received by photodetector 441 and photodetector 444 and therefore proportional to group delay difference between wavelengths $\lambda_1$ and $\lambda_4$. Phase comparator 423 compares the phase of signals from narrowband electronic filter 462 and narrowband electronic filter 463. The output signal of phase comparator 423 is proportional to the phase difference between the signal received by photodetector 442 and photodetector 443 and therefore proportional to group delay difference between wavelengths $\lambda_2$ and $\lambda_3$. Phase comparator 424 compares the phase of signals from narrowband electronic filter 462 and narrowband electronic filter 464. The output signal of phase comparator 424 is proportional to the phase difference between the signal received by photodetector 442 and photodetector 444 and therefore proportional to group delay difference between wavelengths $\lambda_2$ and $\lambda_4$. Phase comparator 434 compares the phase of signals from narrowband electronic filter 463 and narrowband electronic filter 464. The output signal of phase comparator 434 is proportional to the phase difference between the signal received by photodetector 443 and photodetector 444 and therefore proportional to group delay difference between wavelengths $\lambda_3$ and $\lambda_4$. Processing block 402 is further comprised of an analog to digital converter (ADC) and a digital signal processor (DSP) including a memory.

The modulation frequency $f_m$ must be chosen to be as high as possible to improve timing accuracy with a given phase error at the phase comparators 412, 413, 414, 423, 424 and 434, but needs to be small enough to avoid aliasing effects from phase differences larger than 180 degrees. The optimum modulation frequency is then determined by the maximum allowable modulation phase shift of 180 degrees between neighbor wavelengths. The maximum modulation frequency $f_{m,max}$ can then be calculated as $$f_{m,\max} = \frac{180}{360}\frac{1}{D\Delta\lambda},$$

where:

D=range of dispersion; Δλ=change in wavelength.

As an example, for Δλ=10 nm and D=2500 ps/nm, $f_{m,max}$=20 MHz. As the measurement accuracy increases with higher $f_m$, it may be desirable to allow for different modulation frequencies for different fiber types. For example, higher precision is required for lower dispersion fibers (such as LEAF type fiber and TW type fiber) than for SMF type fiber. In a preferred embodiment a tunable modulator 330 with tunable narrowband electronic filters 461, 462, 463, 464 are used to optimally measure the dispersion in different fiber types. It may be noted that the wavelength separations between the four probe wavelengths is on the order of 3–10 nm, which is larger than the typical ITU grid. A subset of ITU wavelength lasers may be used to implement measurement lasers 311, 312, 313 and 314.

The output values of phase comparators, 413, 414, 423, 424 and 434 are voltages which ideally should be linearly proportional to the phase differences between the received signals. In a preferred embodiment, the Analog Devices AD8302 phase detector may be used. In this typical phase detector, the linearity is true over a range of 15 degrees to 165 degrees. For phase differences in the range of 0 degrees to 15 degrees, and in the range of 165 degrees to 180 degrees, the characteristics deviate from a linear curve. However, the full range 0 dgrees to 180 degrees can be utilized with an acceptably small phase error if the phase detector is characterized and a phase-voltage lookup table is constructed. The phase voltage look-up table is implemented in the preferred embodiment by storing the look-up table in processing block 402 and accessing it to interpret the non-linear ranges of the phase detector.

In processing block 402, the output values of phase comparators 412, 413, 414, 423, 424 and 434 are converted from analog to digital and processed according to a seven step algorithm programmed in processing block 402. In a preferred embodiment the phase converter AD8302 has an output voltage range of 2 volts for a phase swing of 180 degrees. Based on a phase detector accuracy of 1 degree, a resolution of 0.1 degree, or 1 mV should be sufficient, requiring a 12 bit analog to digital converter.

In step 1 of the data processing algorithm programmed in processing block 402, the voltage output values of each phase detector are read and converted to phase difference values using the phase-voltage look-up table. According to this step in the data processing algorithm, six phase difference values exist in units of degrees. These phase difference values are $\phi_{12}$ corresponding to the phase difference measured by phase comparator 412, $\phi_{13}$ corresponding to the phase difference measured by phase comparator 413, $\phi_{14}$ corresponding to the phase difference measured by phase comparator 414, $\phi_{23}$ corresponding to the phase difference measured by phase comparator 423, $\phi_{24}$ corresponding to the phase difference measured by phase comparator 424, $\phi_{34}$ corresponding to the phase difference measured by phase comparator 434.

In step 2 of the data processing algorithm programmed in processing block 402, the ambiguity that may be present in $\phi_{13}$, $\phi_{14}$, and $\phi_{24}$, must be corrected according to the following set of rules.

a. If $\phi_{12}+\phi_{23}>180$ then $\phi_{13}:=360-\phi_{13}$
  b. If $\phi_{23}+\phi_{34}>180$ then $\phi_{24}:=360-\phi_{24}$
  c. If ($\phi_{12}+\phi_{23}+\phi_{34}>180$ and $\phi_{12}+\phi_{23}+\phi_{34}<360$) then $\phi_{14}:=360-\phi_{14}$
  d. If $\phi_{12}+\phi_{23}+\phi_{34}>360$ then $\phi_{14}:=360+\phi_{14}$ If the modulation frequency $f_m$ has been chosen correctly, then the phase differences $\phi_{12}$, $\phi_{23}$, and $\phi_{34}$ will be between 0 degrees and 180 degrees and will be unambiguous.

In step 3 of the data processing algorithm programmed in processing block 402, the phase differences are corrected for the propagation differences in the receiver according to the results of a calibration run, which have been stored in memory.

In step 4 of the data processing algorithm programmed in processing block 402, the corrected phase differences are converted into group delay differences, $\tau_{xy}$ in psec using the known modulation frequency $f_m$ in MHz according to the formula:

$$\tau_{xy} = \frac{10^6 \varphi_{xy}}{360 f_m}$$

In step 5 of the data processing algorithm programmed in processing block 402, the group delay differences are used to calculate the group delay at the four known probe wavelengths $\lambda_j$. The group delay at $\lambda_1$ is set to zero, and the four group delay values $\tau_j$ are calculated as:

$$\tau_1 = 0$$

$$\tau_2 = \frac{1}{4}(2\tau_{12} + \tau_{13} - \tau_{23} + \tau_{14} - \tau_{24})$$

$$\tau_3 = \frac{1}{4}(2\tau_{13} + \tau_{12} - \tau_{23} + \tau_{14} - \tau_{34})$$

$$\tau_4 = \frac{1}{4}(2\tau_{14} + \tau_{12} + \tau_{24} + \tau_{13} - \tau_{34})$$

In step 6 of the data processing algorithm programmed in processing block 402, a second order polynomial, $$\tau(\lambda)=a_2\lambda^2+a_1\lambda+a_0$$

is fit to this set of four $(\lambda_j, \tau_j)$ pairs by using a least squared error fit. Here a formal description is given, involving the inversion of a 3×3 matrix:

$$s_k = \sum_{j=1}^{4} \lambda_j^k$$

$$t_k = \sum_{j=1}^{4} \tau_j \lambda_j^k$$

$$\begin{vmatrix} a_2 \\ a_1 \\ a_0 \end{vmatrix} = \begin{vmatrix} s_4 & s_3 & s_2 \\ s_3 & s_2 & s_1 \\ s_2 & s_1 & s_0 \end{vmatrix}^{-1} \begin{vmatrix} t_2 \\ t_1 \\ t_0 \end{vmatrix}$$

In an alternate embodiment, this might be coded in single steps. The wavelength may be normalized to the center wavelength $\lambda_0$ in order to limit round-off errors in the quartic terms of the calculation.

In step 7 of the data processing algorithm programmed in processing block 402, knowledge of $a_2$, $a_1$ and $a_0$ is used to calculate the dispersion at the central wavelength, $D(\lambda_0)$:

$$D(\lambda_0)=2a_2\lambda_0+a_1$$

As the group delay τ is measured in ps, and the wavelengths are measured in nm, the dispersion units will be in ps/nm. The dispersion slope S can be obtained from the second derivative of τ with respect to wavelength:

$$S(\lambda_0) = 2a_2$$

The unit of the dispersion slope is ps/nm2. The inverse relative dispersion slope κ is then calculated as:

$$\kappa(\lambda_0) = \frac{D(\lambda_0)}{S(\lambda_0)}$$

Figure 5:
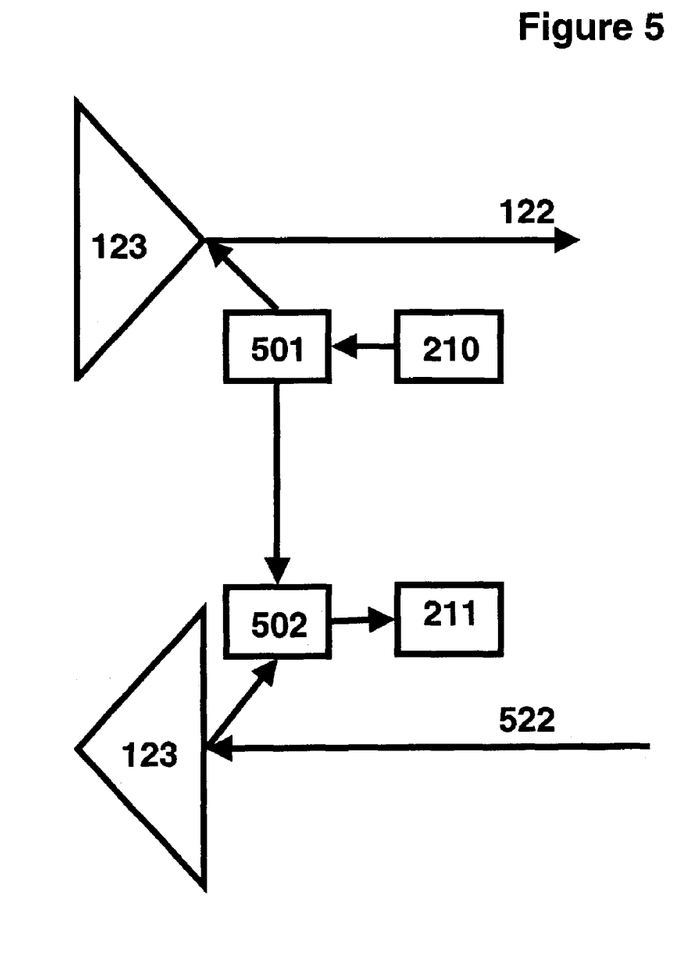
FIG. 5 is a schematic illustration of the invention deployed in a two fiber duplex transport system, including a calibration connection.

In FIG. 5 is shown an alternate embodiment for calibration of the dispersion measurement equipment in an optical transport system offering duplex operation on a pair of fibers. Measurement transmitter module 210 is shown in relation to the first fiber span 122 from one of the two fibers, a second fiber span 522 from the second of the two fibers, optical amplifiers 123, and measurement receiver module 211. Also shown in the figure is optical coupling element 501 and optical coupling element 502. The purpose of optical coupling element 501 and optical coupling element 502 is to enable a connection for calibration of the different path lengths for different wavelengths in the measurement receiver module. In a preferred embodiment, optical coupling element 501 is a 1% tap that routes 1% of the modulated light signal towards measurement receiver module 211. In this preferred embodiment, optical coupling element 502 is a 1 by 2 optical switch that enables measurement receiver module 211 to monitor the output of fiber span 522 or the calibration signal from measurement transmitter module 210.

Before dispersion measurement of the fiber span is taken, the receiver module needs to be calibrated to account for propagation delay differences between the four wavelength signals after de-multiplexing in the receiver. While all the transmitters produce a perfectly synchronous modulation on all wavelengths, the path lengths for the different wavelength signals in the receiver can differ slightly. By switching to a calibration signal that has not experienced chromatic dispersion, the path differences can be measured and stored in the signal processing device. A calibration signal without chromatic dispersion is available at the local transmitter directly adjacent the receiver. In the preferred embodiment, an optical switch at the receiver input is thrown to receive a signal directly from the local transmitter. This signal has not experienced chromatic dispersion and should yield a group delay of zero for all wavelengths. Measurement group delay values are stored in memory and taken into account in step 3 of the data processing algorithm to be described later.

As shown in FIG. 4, in order to facilitate calibration and to accommodate small random path length variations, the path length between the four wavelength signal branches from the de-multiplexer to the photodetector should differ by approximately 5 degrees of modulation frequency $f_m$. For example, at $f_m$=20 MHz, 5 degrees results in a difference of about 700 ps. 700 ps corresponds to a fiber length difference of about 14 cm between neighbor wavelengths. For example, the path for $\lambda_4$ should be 14 cm longer than the path for $\lambda_3$, which should be 14 cm longer than the path for $\lambda_2$ which in turn should be 14 cm longer than the path for $\lambda_1$.

Figure 6:
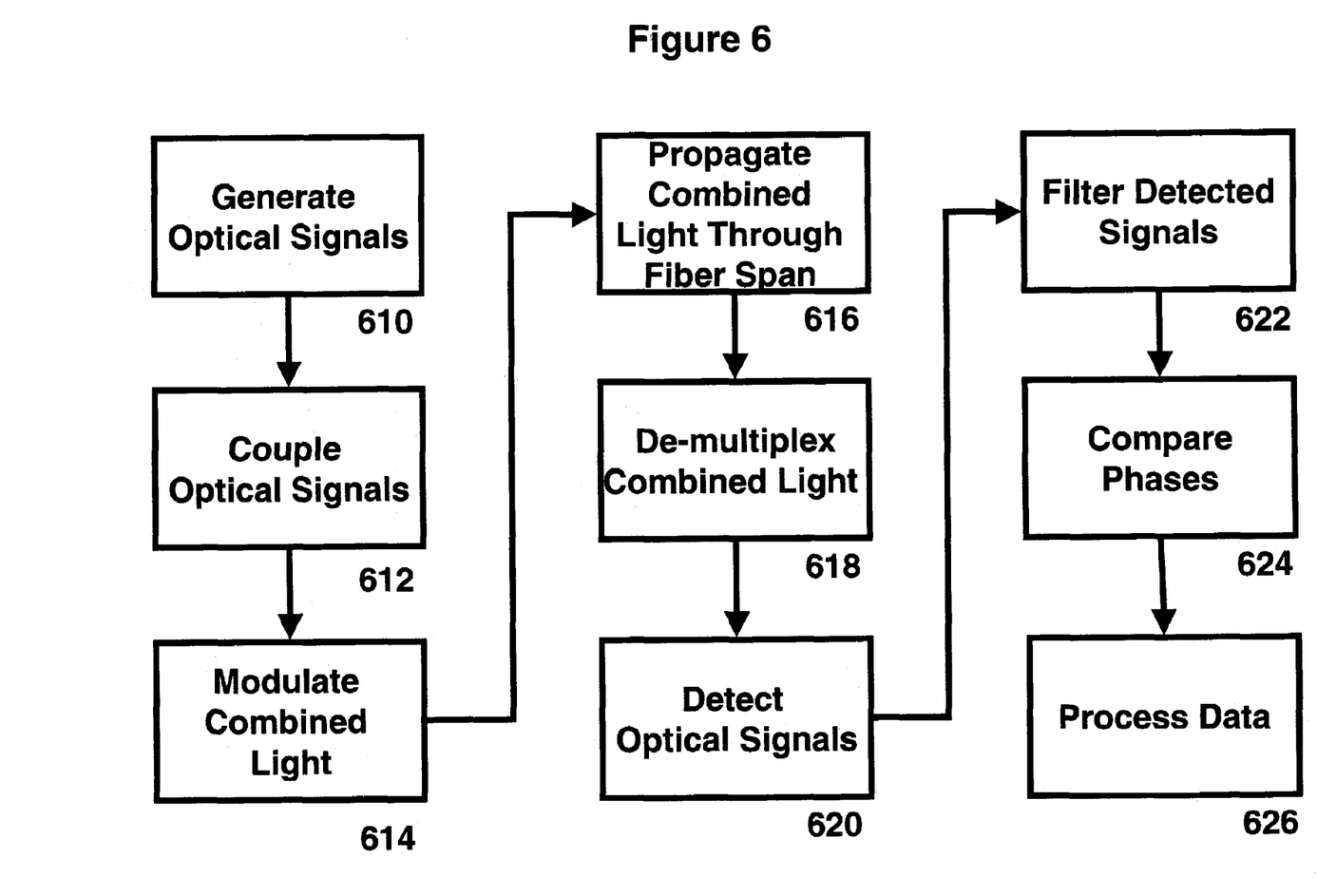
FIG. 6 is a flow chart depicting the method of dispersion measurement which is a subject of this invention.

In FIG. 6 is a flow chart depicting the method of dispersion measurement. In step 610, four laser signals are generated, at wavelengths $\lambda_1$, $\lambda_2$, $\lambda_3$, and $\lambda_4$. The difference between wavelengths $\lambda_1$ and $\lambda_2$ is Δλ, the difference between wavelengths $\lambda_2$ and $\lambda_3$ is Δλ and the difference between wavelengths $\lambda_3$ and $\lambda_4$ is Δλ. The four wavelengths are centered around a target wavelength $\lambda_0$. In step 612, the light of these four continuous wave measurement lasers are coupled together. In step 614, the combined light from the four measurement lasers are then modulated at a sinusoidal frequency $f_m$ using intensity modulator. In a preferred embodiment, the modulation depth of the modulated composite laser signal should be between 10% and 50%. In Step 616, the modulated combined light from the four measurement lasers is propagated down a fiber span, to be characterized. In step 618, the combined light is de-multiplexed, and in step 620, the light from the four lasers is detected on four receiver photodetectors. In step 620, the outputs from these four photodetectors is filtered in a narrowband electronic filter. In step 622 the phases of each signal pair is compared. In step 624 the data is processed in order to calculate the dispersion and the dispersion slope at target wavelength $\lambda_0$.

While this invention has been described in reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

The invention claimed is:

1. An optical fiber dispersion measurement system comprising:
   a measurement transmitter module connected to the fiber for producing a modulated signal from at least four optical signals; and
   a measurement receiver module connected to the fiber for receiving the modulated signal and comparing the phase of the four optical signals, wherein the measurement receiver module comprises:
      a photonic decoupler connected to the fiber to separate the modulated signal into a first signal, a second signal, a third signal and a fourth signal,
      a first opto electronic converter connected to the photonic decoupler to convert the first signal into a first electronic signal,
      a second opto electronic converter connected to the photonic decoupler to convert the second signal into a second electronic signal,
      a third opto electronic converter connected to the photonic decoupler to convert the third signal into a third electronic signal,
      a fourth opto electronic converter connected to the photonic decoupler to convert the fourth signal into a fourth electronic signal,
      a first phase comparator receiving the first and second electronic signal and producing a first differential signal,
      a second phase comparator receiving the first and third electronic signal and producing a second differential signal,
      a third phase comparator receiving the first and fourth electronic signal and producing a third differential signal,
      a fourth phase comparator receiving the second and third electronic signal and producing a fourth differential signal,
      a fifth phase comparator receiving the second and fourth electronic signal and producing a fifth differential signal,
      a sixth phase comparator receiving the third and fourth electronic signal and producing a sixth differential signal, and a processor to receive the first, second, third, fourth, fifth and sixth differential signals and programmed to calculate the dispersion and dispersion slope from the differential signals.

2. The system of claim 1 wherein the modulated signal is sinusoidal.

3. The system of claim 2 wherein the modulation depth of the modulated signal is about 10 to 50%.

4. The system of claim 1 wherein the measurement transmitter comprises:
   a first laser, a second laser, a third laser and a fourth laser;
   each laser connected to a photonic coupler and producing one of the four optical signals;
   the photonic coupler optically coupled to an intensity modulator; and
   an intensity modulator optically coupled to the fiber whereby the modulated signal is transmitted on the fiber.

5. The system of claim 4 wherein:
   the first laser is tuned to a wavelength $\lambda_1$;
   the second laser is tuned to a wavelength $\lambda_2$;
   the third laser is tuned to a wavelength $\lambda_3$;
   the fourth laser is tuned to a wavelength $\lambda_4$; and
   $\lambda_1$, $\lambda_2$, $\lambda_3$ and $\lambda_4$ are each separated by a wavelength difference $\Delta\lambda$.

6. The system of claim 5 wherein $\lambda_1$, $\lambda_2$, $\lambda_3$ and $\lambda 4$ are centered around a single wavelength $\lambda_0$.

7. The system of claim 6 wherein the $\lambda_0$ is controlled to ±0.1 nm.

8. The system of claim 6 wherein $\Delta\lambda$ is controlled to ±0.02 nm.

9. The system of claim 4 wherein the photonic coupler is a multiplexer.

10. The system of claim 4 wherein the photonic coupler is an array waveguide.

11. The system of claim 4 wherein the intensity modulator includes an amplifier.

12. The system of claim 1 wherein the opto electronic converters are photo diodes.

13. The system of claim 12 wherein the photo diodes are PIN diodes.

14. The system of claim 12 wherein the photo diodes are avalanche diodes.

15. The system of claim 1 wherein the photonic decoupler is a demultiplexer.

16. The system of claim 1 wherein an amplifier and a narrow band filter are connected to each opto electronic converter and to the processor to amplify and filter each signal.

17. The system of claim 1 wherein the processor performs the following steps:
   converting each differential signal to a phase difference value according to the following equations:
   first differential signal=$\phi_{12}$
   second differential signal=$\phi_{13}$
   third differential signal=$\phi_{14}$
   fourth differential signal=$\phi_{15}$
   fifth differential signal=$\phi_{16}$
   sixth differential signal=$\phi_{17}$;
   eliminating ambiguity according to the following equations:
   If $\phi_{12}+\phi_{23}>180$ then $\phi_{13}:=360-\phi_{13}$
   If $\phi_{23}+\phi_{34}>180$ then $\phi_{24}:=360-\phi_{24}$
   If ($\phi_{12}+\phi_{23}+\phi_{34}>180$ and $\phi_{12}+\phi_{23}+\phi_{34}<360$) then $\phi_{14}:=360-\phi_{14}$
   If $\phi_{12}+\phi_{23}+\phi_{34}>360$ then $\phi_{14}:=360+\phi_{14}$;
   adjusting the phase differences according to a set of calibration values;
   converting the phase differences into group differences according to the following equation:

$$\tau_{xy} = \frac{10^6 \varphi_{xy}}{360 f_m};$$

calculating group delay according to the following equations:

$$\tau_1 = 0$$
$$\tau_2 = \frac{1}{4}(2\tau_{12} + \tau_{13} - \tau_{23} + \tau_{14} - \tau_{24})$$
$$\tau_3 = \frac{1}{4}(2\tau_{13} + \tau_{12} - \tau_{23} + \tau_{14} - \tau_{34})$$
$$\tau_4 = \frac{1}{4}(2\tau_{14} + \tau_{12} + \tau_{24} + \tau_{13} - \tau_{34});$$

fitting a second order polynomial of the form
   $\tau(\lambda)=A_2\lambda^2+A_1\lambda+A_0$
to a set of ($\lambda_j$, $\tau_j$) pairs using a least squared error fit; calculating the dispersion according to the equation:
   $D(\lambda)=2a_2\lambda_0+a_1$; and
calculating the dispersion slope from the second derivative of $\tau_j$ with respect to $\lambda_j$.

18. The system of claim 17 wherein the step of fitting is computed in single steps.

19. The system of claim 17 wherein the step of fitting where the set of ($\tau_i$, $\tau_j$) pairs is fit to the polynomial
   $\tau(\lambda)=A_2\lambda^2+A_1\lambda+A_0$
according to the following procedure:

$$s_k = \sum_{j=1}^{4} \lambda_j^k$$

$$t_k = \sum_{j=1}^{4} \tau_j \lambda_j^k$$

$$\begin{vmatrix} a_2 \\ a_1 \\ a_0 \end{vmatrix} = \begin{vmatrix} s_4 & s_3 & s_2 \\ s_3 & s_2 & s_1 \\ s_2 & s_1 & s_0 \end{vmatrix}^{-1} \begin{vmatrix} t_2 \\ t_1 \\ t_0 \end{vmatrix}.$$

* * * * *

UNITED STATES PATENT AND TRADEMARK OFFICE
CERTIFICATE OF CORRECTION

PATENT NO. : 7,206,516 B2
APPLICATION NO. : 10/427897
DATED : April 17, 2007
INVENTOR(S) : Michael H. Eiselt It is certified that error appears in the above-identified patent and that said Letters Patent is hereby corrected as shown below:

Title Page,
Item (56), References Cited,

U.S. PATENT DOCUMENTS:
Insert missing reference -- 4,799,790 01/1989 Tsukamoto et al. --.

Column 1,
Line 66, delete "modem" and insert -- modern --.

Column 7,
Line 53, delete "$\phi_{12}$" and insert -- $\varphi_{12}$ --.
Line 54, delete "$\phi_{13}$" and insert -- $\varphi_{13}$ --.
Line 55, delete "$\phi_{14}$" and insert -- $\varphi_{14}$ --.
Line 57, delete "$\phi_{23}$" and insert -- $\varphi_{23}$ --.
Line 58, delete "$\phi_{24}$" and insert -- $\varphi_{24}$ --.
Line 59, delete "$\phi_{34}$" and insert -- $\varphi_{34}$ --.
Line 64, delete "$\phi_{13}$, $\phi_{14}$, and $\phi_{24}$," and insert -- $\varphi_{13}$, $\varphi_{14}$, and $\varphi_{24}$, --.
Line 66, delete "a. If $\phi_{12}+\phi_{23}>180$ then $\phi_{13}:=360-\phi_{13}$" and insert -- a. If $\varphi_{12}+\varphi_{23}>180$ then $\varphi_{13}:=360-\varphi_{13}$ --.
Line 67, delete "b. If $\phi_{23}+\phi_{34}>180$ then $\phi_{24}:=360-\phi_{24}$" and insert -- b. If $\varphi_{23}+\varphi_{34}>180$ then $\varphi_{24}:=360-\varphi_{24}$ --.
Column 8,
Line 1, delete "c. If ($\phi_{12}+\phi_{23}+\phi_{34}>180$ and $\phi_{12}+\phi_{23}+\phi_{34}<360$) then $\phi_{14}$:" and insert -- c. If ($\varphi_{12}+\varphi_{23}+\varphi_{34}>180$ and $\varphi_{12}+\varphi_{23}+\varphi_{34}<360$) then $\varphi_{14}$: --.
Line 2, delete "$=360-\phi_{14}$" and insert -- $=360-\varphi_{14}$ --.
Line 3, delete "d. If $\phi_{12}+\phi_{23}+\phi_{34}>360$ then $\phi_{14}:=360+\phi_{14}$" and insert -- d. If $\varphi_{12}+\varphi_{23}+\varphi_{34}>360$ then $\varphi_{14}:=360+\varphi_{14}$ --.
Line 5, delete "$\phi_{12}$, $\phi_{23}$, and $\phi_{34}$" and insert -- $\varphi_{12}$, $\varphi_{23}$, and $\varphi_{34}$ --.
Line 43, delete "($\lambda_j$, $\tau_j$)" and insert -- ($\lambda_j$, $\tau_j$) --.

UNITED STATES PATENT AND TRADEMARK OFFICE
CERTIFICATE OF CORRECTION

PATENT NO. : 7,206,516 B2
APPLICATION NO. : 10/427897
DATED : April 17, 2007
INVENTOR(S) : Michael H. Eiselt It is certified that error appears in the above-identified patent and that said Letters Patent is hereby corrected as shown below:

Column 11,
Line 26, delete "λ4" and insert -- $\lambda_4$ --.
Line 54, delete "signal=$\phi_{12}$" and insert -- signal=$\varphi_{12}$ --.
Line 55, delete "signal=$\phi_{13}$" and insert -- signal=$\varphi_{13}$ --.
Line 56, delete "signal=$\phi_{14}$" and insert -- signal=$\varphi_{14}$ --.
Line 57, delete "signal=$\phi_{15}$" and insert -- signal=$\varphi_{15}$ --.
Line 58, delete "signal=$\phi_{16}$" and insert -- signal=$\varphi_{16}$ --.
Line 59, delete "signal=$\phi_{17}$;" and insert -- signal=$\varphi_{17}$; --.

Column 12,
Line 3, delete "If $\phi_{12}+\phi_{23}>180$ then $\phi_{13}:=360-\phi_{13}$" and insert -- If $\varphi_{12}+\varphi_{23}>180$ then $\varphi_{13}:=360-\varphi_{13}$ --.
Line 4, delete "If $\phi_{23}+\phi_{34}>180$ then $\phi_{24}:=360-\phi_{24}$" and insert -- If $\varphi_{23}+\varphi_{34}>180$ then $\varphi_{24}:=360-\varphi_{24}$ --.
Lines 5-6, delete "If ($\phi_{12}+\phi_{23}+\phi_{34}>180$ and $\phi_{12}+\phi_{23}+\phi_{34}<360$) then $\phi_{14}:=360-\phi_{14}$" and insert -- If ($\varphi_{12}+\varphi_{23}+\varphi_{34}>180$ and $\varphi_{12}+\varphi_{23}+\varphi_{34}<360$) then $\varphi_{14}:=360-\varphi_{14}$ --.
Line 7, delete "If $\phi_{12}+\phi_{23}+\phi_{34}>360$ then $\phi_{14}:=360+\phi_{14}$;" and insert -- If $\varphi_{12}+\varphi_{23}+\varphi_{34}>360$ then $\varphi_{14}:=360+\varphi_{14}$; --.

Signed and Sealed this

Second Day of September, 2008

JON W. DUDAS
*Director of the United States Patent and Trademark Office*